(12) United States Patent
Foster et al.

(10) Patent No.: US 9,380,911 B1
(45) Date of Patent: Jul. 5, 2016

(54) COOKING APPARATUS EMPLOYING A ROTATING COOKING BASKET SUPPORTED BY EXTENSIBLE SUPPORT STRUCTURE

(71) Applicants: Paul Foster, Lincoln, RI (US); Del M. Thornock, Concord, CA (US); Leonard L. Hofheins, Provo, UT (US)

(72) Inventors: Paul Foster, Lincoln, RI (US); Del M. Thornock, Concord, CA (US); Leonard L. Hofheins, Provo, UT (US)

( * ) Notice: Subject to any disclaimer, the term of this patent is extended or adjusted under 35 U.S.C. 154(b) by 199 days.

(21) Appl. No.: 13/969,789

(22) Filed: Aug. 19, 2013

(51) Int. Cl.
*A47J 37/12* (2006.01)
*A47J 37/04* (2006.01)

(52) U.S. Cl.
CPC ............ *A47J 37/1219* (2013.01); *A47J 37/047* (2013.01); *A47J 37/129* (2013.01)

(58) Field of Classification Search
CPC ... A47J 37/047; A47J 37/1219; A47J 37/129; A47J 37/1295

USPC ............ 99/409, 407, 403, 336, 348; 210/167, 210/167.28, DIG. 8
See application file for complete search history.

(56) References Cited

U.S. PATENT DOCUMENTS

| | | | | |
|---|---|---|---|---|
| 2,568,792 | A | * | 9/1951 | Cripps ........................... 99/335 |
| 5,010,805 | A | * | 4/1991 | Ferrara ........................... 99/353 |
| 5,611,265 | A | * | 3/1997 | Ronci et al. ................... 99/353 |
| 8,065,954 | B2 | * | 11/2011 | Foster et al. ................... 99/336 |
| 2003/0192435 | A1 | * | 10/2003 | McNair ........................... 99/330 |
| 2004/0060456 | A1 | * | 4/2004 | Chung ........................... 99/407 |
| 2009/0212044 | A1 | * | 8/2009 | Stanton et al. ................ 219/682 |

* cited by examiner

*Primary Examiner* — Reginald L Alexander
(74) *Attorney, Agent, or Firm* — Thomas R. Lampe (57) ABSTRACT

Cooking apparatus including a receptacle for holding cooking oil and an extensible support centrally located within the receptacle for supporting a cooking basket, and for moving the basket between upper and lower positions in the receptacle and rotating the basket when the basket is in the upper position.

15 Claims, 10 Drawing Sheets

COOKING APPARATUS EMPLOYING A ROTATING COOKING BASKET SUPPORTED BY EXTENSIBLE SUPPORT STRUCTURE

TECHNICAL FIELD

This invention relates to a system for cooking food in cooking liquid, and more particularly to apparatus for cooking food in a rotatable basket which is moved between a lowered cooking position and an elevated position wherein the basket is removed from the cooking oil and rotatable to remove excess cooking liquid from the food.

BACKGROUND OF THE INVENTION

It is known to employ baskets to hold food to be cooked which are lowered into cooking oil and utilized to cook food with the basket not rotating and then elevating and rotating the basket above the cooking oil to remove excess cooking oil from the food.

A representative prior art device of this type is the Perfect Fry commercial ventless deep fryer made available by Perfect Fry Company LLC which incorporates a Spin Fresh centrifugal cooking system which uses a lift arm and lift motor outside the cooking oil vessel to lift a basket and then spin the basket.

The prior art approaches have a number of drawbacks and operational deficiencies that the center lift and rotating structure and other structural features disclosed and claimed herein correct and/or eliminate.

DISCLOSURE OF INVENTION

The cooking apparatus of the present invention includes a receptacle having a bottom and side wall defining a receptacle interior for accommodating cooking oil or other cooking liquid.

Heating structure is operatively associated with the receptacle for heating the cooking liquid in the receptacle interior.

An elongated extensible basket support extends upwardly from the receptacle bottom into the interior, the basket support spaced from the side wall and selectively alternatively forming an extended configuration or forming a non-extended configuration.

First actuator structure is operatively associated with the basket support for selectively alternatively moving the basket support between the extended configuration and the non-extended configuration.

The cooking apparatus further includes a basket supported by the basket support and including a basket bottom and a basket outer wall defining a basket interior for holding food. Movement of the basket support to the extended configuration by the first actuator structure lifts the basket within the receptacle interior and movement of the basket support by the first actuator structure to the non-extended configuration lowers the basket within the receptacle interior.

Second actuator structure is operatively associated with the basket support for spinning the basket when the basket support is in the extended configuration.

Other features, advantages and objects of the present invention will become apparent with reference to the following description and accompanying drawings.

MODES FOR CARRYING OUT THE INVENTION

Figure 4:
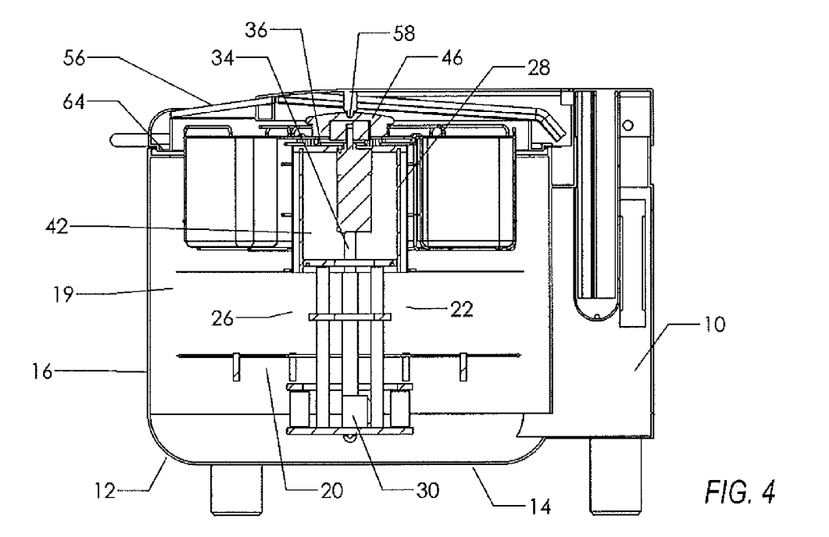
FIG. 4 is a cross-sectional, elevational view illustrating the lid closed and the relative positions assumed by the basket and basket support when the basket is in raised position by the extended elongated basket support, a cooking module including a thermostat controlled heating element also being shown in the receptacle.

Referring now to the drawings, cooking apparatus constructed in accordance with the teachings of the present invention includes a housing 10 having a receptacle 12. A bottom 14 and cylindrical side wall 16 of the receptacle define a receptacle interior for accommodating cooking oil or other cooking fluid. Heating structure is operatively associated with the receptacle for heating the cooking liquid in the receptacle interior. Operation of the heating structure as well as other components and operations of the cooking apparatus, such as spin cycles, may be controlled from a front control panel 18. FIG. 4 shows heating structure in the form of a module 19 with thermostat controlled heater elements 20 disposed at the bottom of the receptacle.

Figure 5:
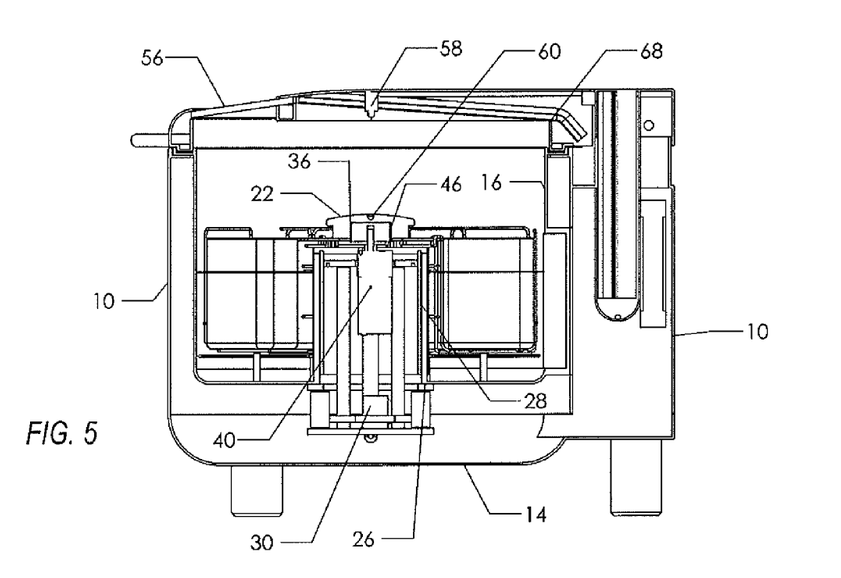
FIG. 5 is a view similar to FIG. 4, but illustrating the elongated extensible basket support in a non-extended configuration and the basket supported thereby lowered to cooking position within the receptacle interior, the cooking module having been removed.
Figure 7:
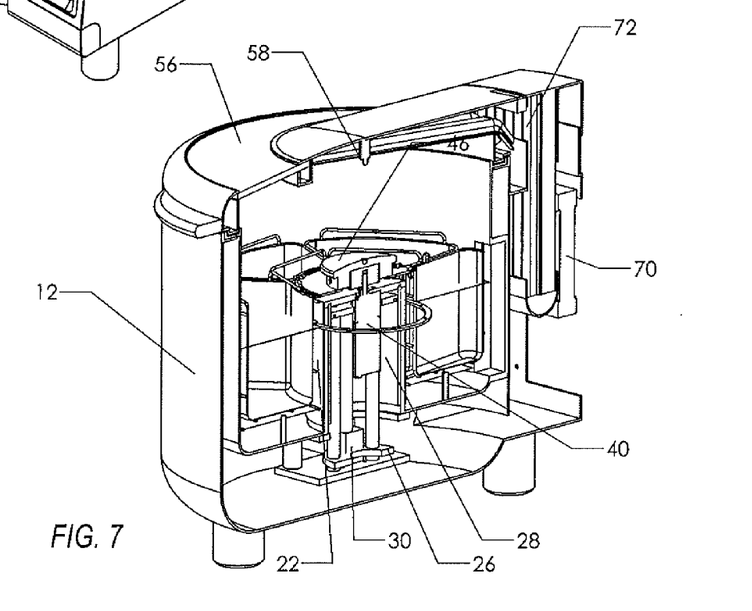
FIG. 7 is a cross-sectional, perspective view of the apparatus with the lid closed, the basket support in non-extended configuration and the basket lowered to the non-rotatable position it assumes during cooking of food (not shown) in the basket.

An elongated extensible basket support 22 extends upwardly from the receptacle bottom into the receptacle interior. The basket support is disposed at the center of the receptacle and spaced equidistant from the inner surface of the side wall 16. The basket support member selectively alternatively forms an extended configuration, shown in FIGS. 3 and 4 for example, and a non-extended configuration shown in FIGS. 5, 7 and 8 for example.

First actuator structure is operatively associated with the basket support for selectively alternatively moving the basket support between the extended configuration and the non-extended configuration.

The basket support includes a lower segment 26 extending upwardly from the receptacle bottom and an upper segment 28 movable along a vertical axis relative to the lower segment.

The first actuator segment includes an electric motor 30 operatively associated with the upper segment to alternatively move the upper segment up or down along the vertical axis relative to the lower segment. The disclosed first actuator structure comprises a linear actuator, the motor being operatively connected to a threaded rotatable shaft 34 (see FIG. 4) to move a support platform 36 between the positions illustrated in FIG. 4 and FIG. 5. The support platform 36 comprises a portion of the upper segment 28 and supports an electric motor 40 disposed within the cylindrical shaped portion 42 of the upper segment, the rotatable shaft 44 of the motor projecting in an upward direction.

The upper segment includes a portion 46 at the upper end thereof that is readily removable from the rest of the upper segment. When positioned on the rest of the upper segment, the upper segment portion 46 receives the rotatable shaft 44 of the electric motor 40. The shaft and upper segment portion 46 are keyed together whereby the upper segment portion 46 will rotate when the electric motor 40 is energized.

The upper segment portion 46 supports basket 50 of open wire construction. Basket 50 is illustrated in FIGS. 3-5, 7, 9 and 10. The basket includes a basket bottom 52 and a basket outer wall 54 defining a basket interior for holding food. Basket 50 will be described in greater detail below. Movement of the basket support to the extended configuration by the first actuator structure raises the basket within the receptacle interior above the level of cooking liquid therein. Movement of the basket support by the first actuator structure to the non-extended configuration lowers the basket within the receptacle interior into the lower portion thereof holding the cooking oil.

The second actuator structure including electric motor 40 is operatively associated with the basket support for spinning the basket when the basket support is in the extended configuration. Suitable circuitry including switches of the apparatus ensures deenergization of the electric motor 40 when the upper segment moves downwardly to reposition the basket from the raised to the lowered position.

Figure 9:
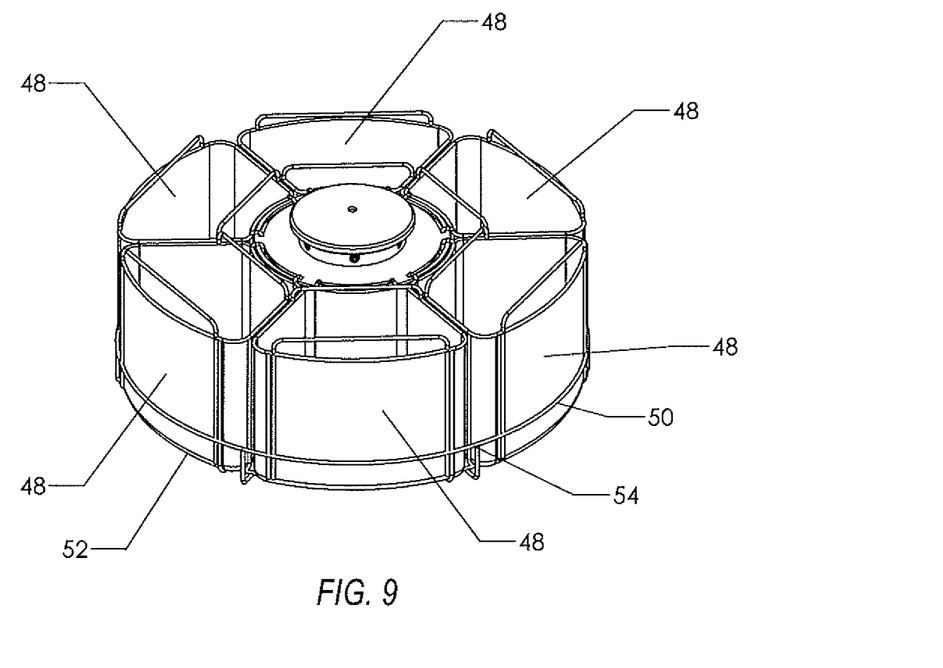
FIG. 9 is a perspective view showing an open wire basket holding plurality of cooking compartments or segments independently connected to the upper portion of the basket support.
Figure 11:
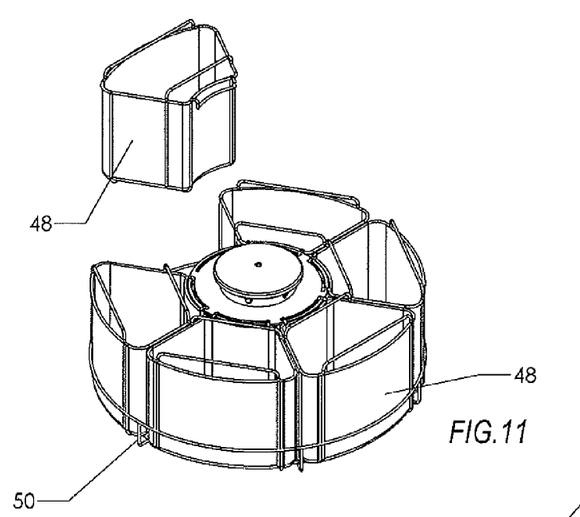
FIG. 11 is an exploded, perspective view of the basket configuration of FIG. 9 illustrating one of the cooking compartments or segments removed.
Figure 13:
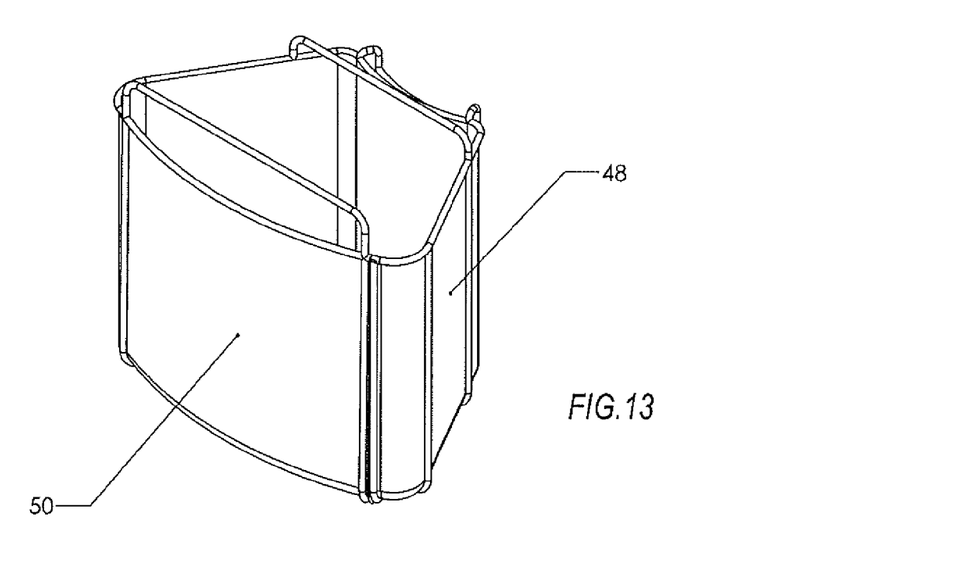
FIG. 13 is an enlarged, perspective view showing a basket segment of the FIG. 11 embodiment with a pivoted closure element thereof in closed condition.
Figure 14:
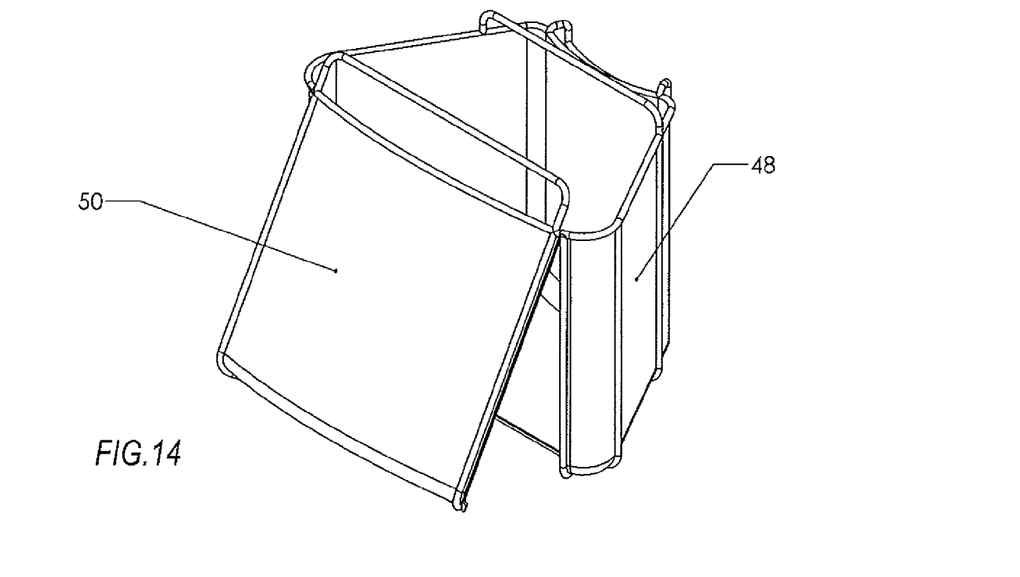
FIG. 14 is a view similar to FIG. 13, but illustrating the closure element open to dispense the contents of the basket segment.

The basket 50 has a toridal configuration and defines a central recess or opening accommodating the basket support. Basket 50 includes a plurality of cooking segments or compartments 48 which are positioned on the basket bottom and individually connected to the upper segment portion 46 by a hook arrangement or other suitable connection. FIG. 9 shows all of the cooking segments in place and FIG. 11 shows one of the segments removed. FIG. 13 and FIG. 14 respectively show a pivoted door 50 of the segment closed and open, the feature allowing the contents of the compartment to be readily removed.

Figure 3:
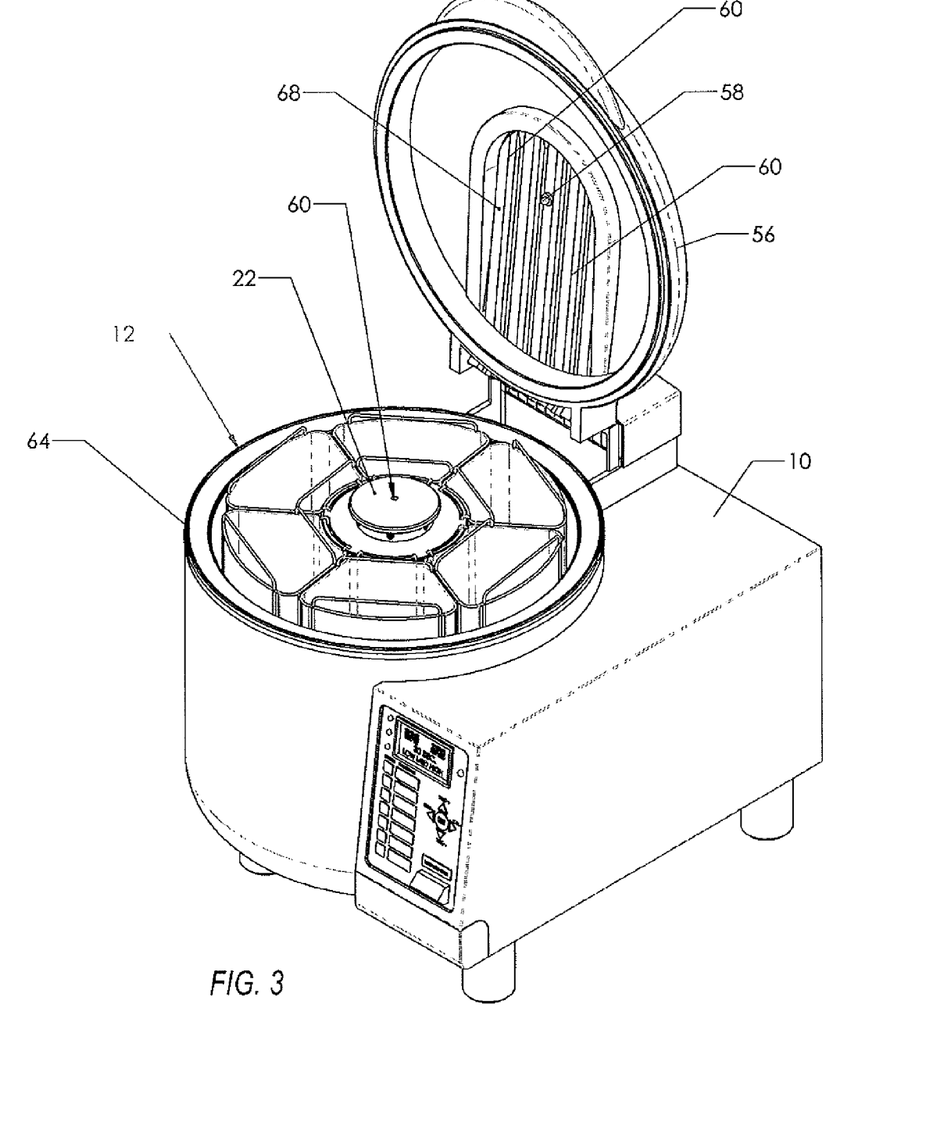
FIG. 3 is a view similar to FIG. 2, but illustrating the lid in raised condition to expose a basket disposed within the apparatus receptacle and supported by a centrally disposed, elongated extensible basket support.

The cooking apparatus includes a lid or cover 56 pivotally connected to the housing 10 at the receptacle and movable between open and closed positions, FIGS. 1, 2 and 4-8 showing the lid closed. FIG. 3 shows the lid open. Suitable switching will halt any spinning of the basket when the cover or lid 56 is opened.

The lid includes a projection 58 which has a distal end positioned in an indent 60 formed at the center of upper segment portion 46 at the top surface thereof when the cover or lid is closed. The projection is cooperable with the upper segment 28 to stabilize the basket support and limit movement of the basket support caused by spinning of the basket.

The lid has a domed underside for directing moisture outwardly and downwardly to a trough 64 formed at the upper outer periphery of side wall 16 of the receptacle.

The lid 56 additionally includes a plurality of overlapping channel members 68 disposed at an angle under the domed underside of the lid for collecting built up condensation and moisture at the lid. The slanted channel members direct accumulated condensation toward the peripherally extending collection trough.

Figure 6:
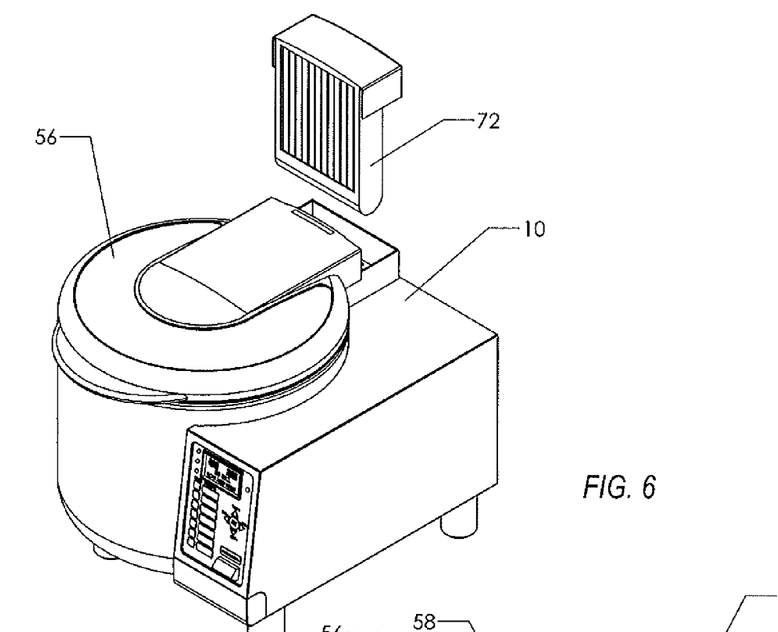
FIG. 6 is a view similar to FIG. 2, but illustrating a filter employable in the apparatus prior to insertion into operative position.

The cooking apparatus additionally includes filtration structure for controlling moisture and odor emissions relating to cooking of foods within the receptacle. More particularly, the filtration structure includes a variable speed fan 70 and a filter 72 operatively associated with the variable speed fan. FIG. 6 shows the filter removed for potential cleaning or replacement. A fan control may be incorporated in the control circuitry controlled by control panel 18 for changing the speed of the variable speed fan during cooking and terminating operation of the fan during spinning of the basket.

Figure 10:
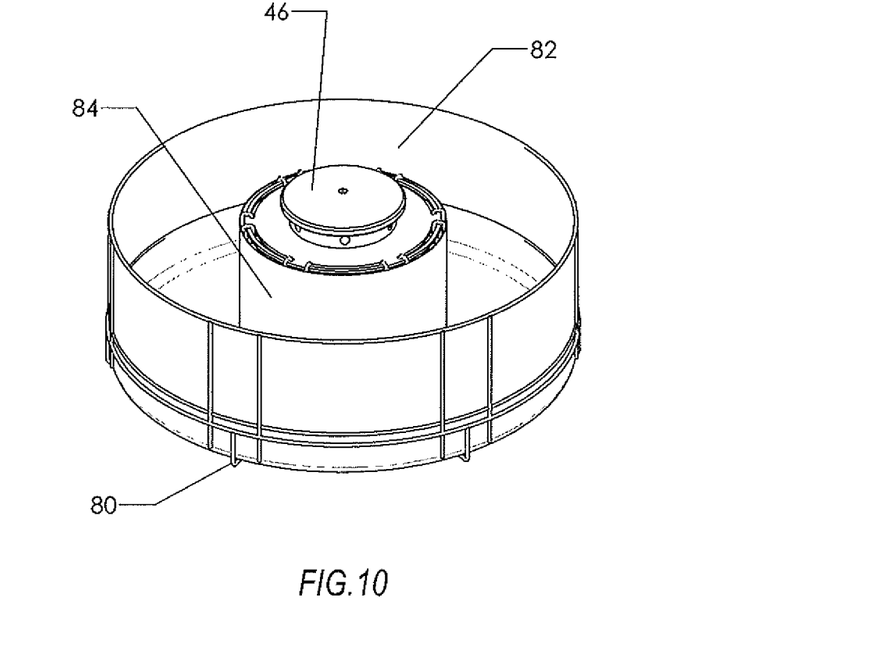
FIG. 10 discloses an open wire basket holding a toroidal shaped, metal cooking unit connected to the upper portion of the basket support.
Figure 12:
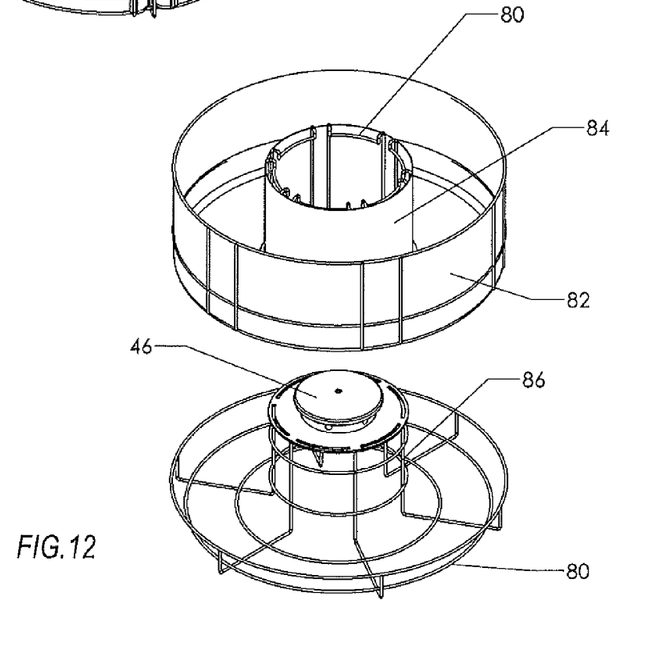
FIG. 12 is an exploded, perspective view illustrating the arrangement of FIG. 10 and showing the metal cooking unit removed from the open wire basket and the upper portion of the basket support.

Various types of baskets, basket configurations and basket auxiliary structural features may be employed with the cooking apparatus. FIGS. 10 and 12 for example, show open wire basket 80 and a toroidal-shaped metal cooking container 82 positioned in the interior of the basket. Container 82 has a cylindrically-shaped inner wall 84 for receiving upper segment 28 of the basket support and a central portion 86 of basket 80. In this arrangement basket 80 is attached to upper segment portion 46. Hooks 88 are used to releasably connect container 82 to basket 80.

As previously indicated, panel 18 of the device may be used to control a variety of functions of the apparatus, including, but not limited to, cooking temperature, cooking times and times and cycles of basket rotation. The apparatus preferably includes a micro-controller programmed to carry out specific operational routines to cook certain types of food products.

Figure 1:
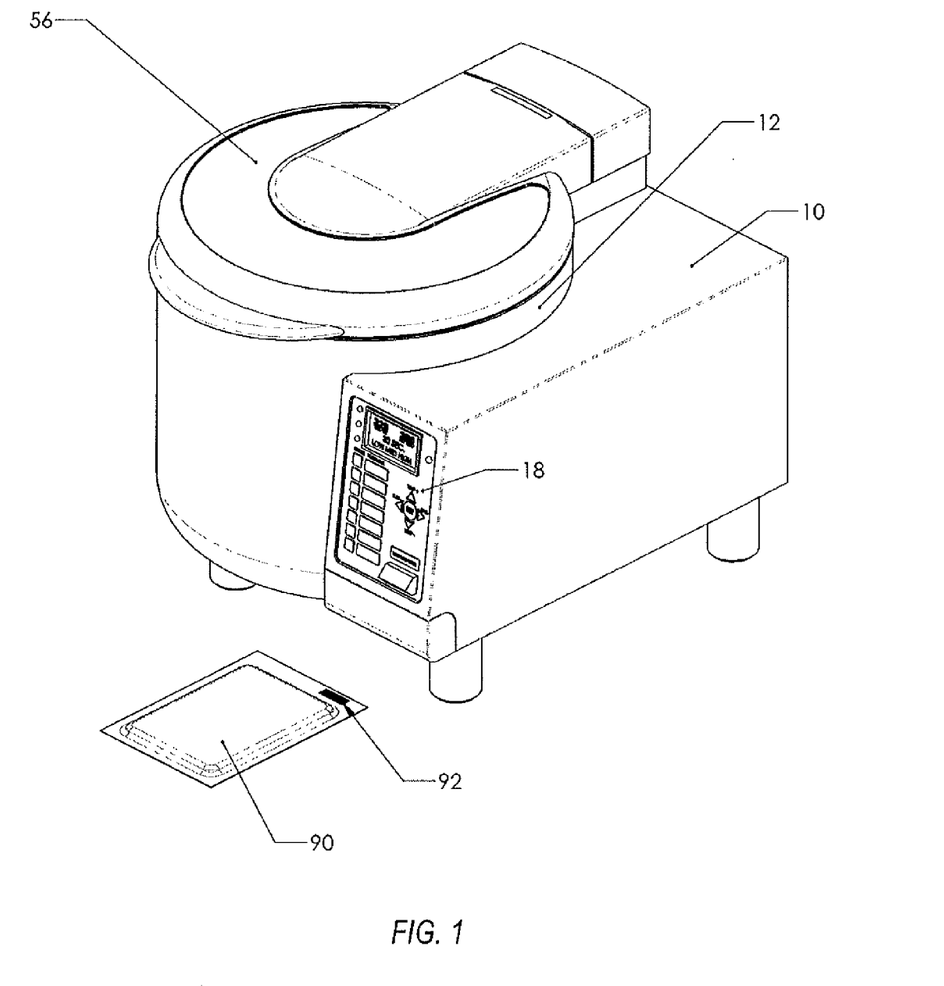
FIG. 1 is a perspective view of apparatus constructed in accordance with the teachings of the present invention with the top lid thereof closed and further illustrating an encoded food pouch prior to insertion in the apparatus.
Figure 2:
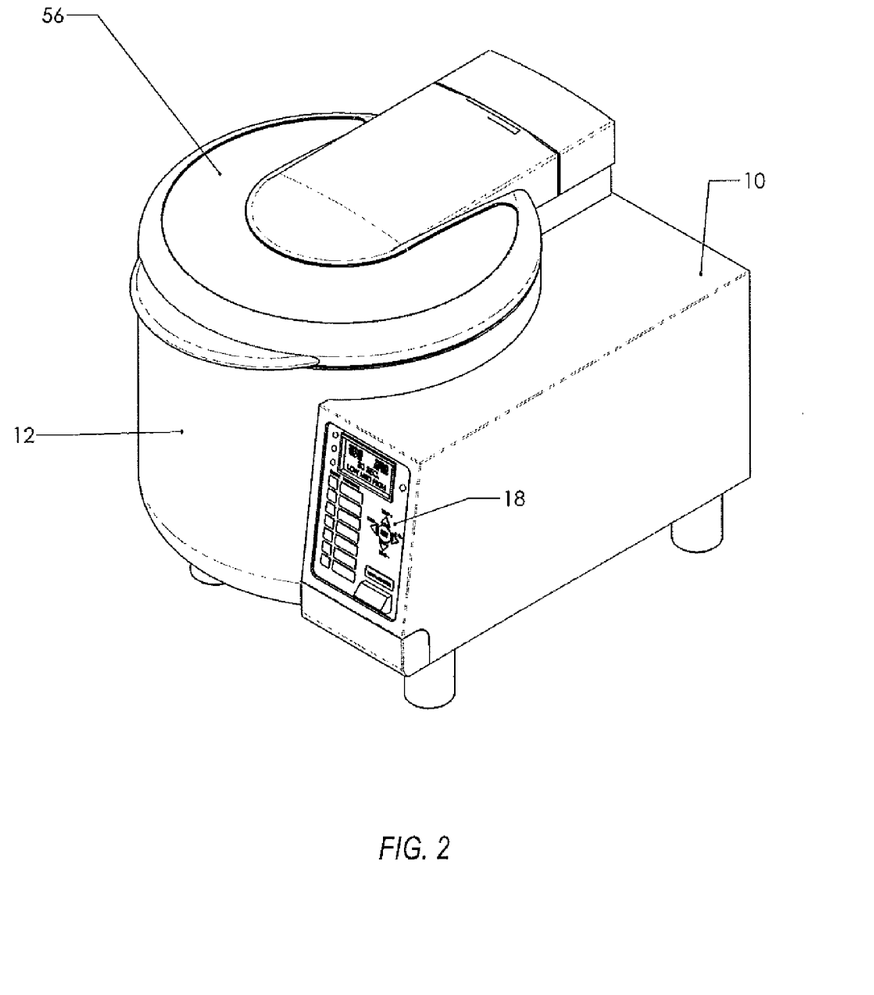
FIG. 2 is a view similar to FIG. 1 illustrating the condition of the apparatus after the food pouch has been inserted therein.

FIG. 1 shows an encoded element such as an empty food pouch 90 encoded as at position 92 for controlling operation of the apparatus when utilizing the particular food product formerly contained by the pouch during cooking. Another approach would be to utilize encoded cards or labels, possibly imprinted with recipes.

Figure 8:
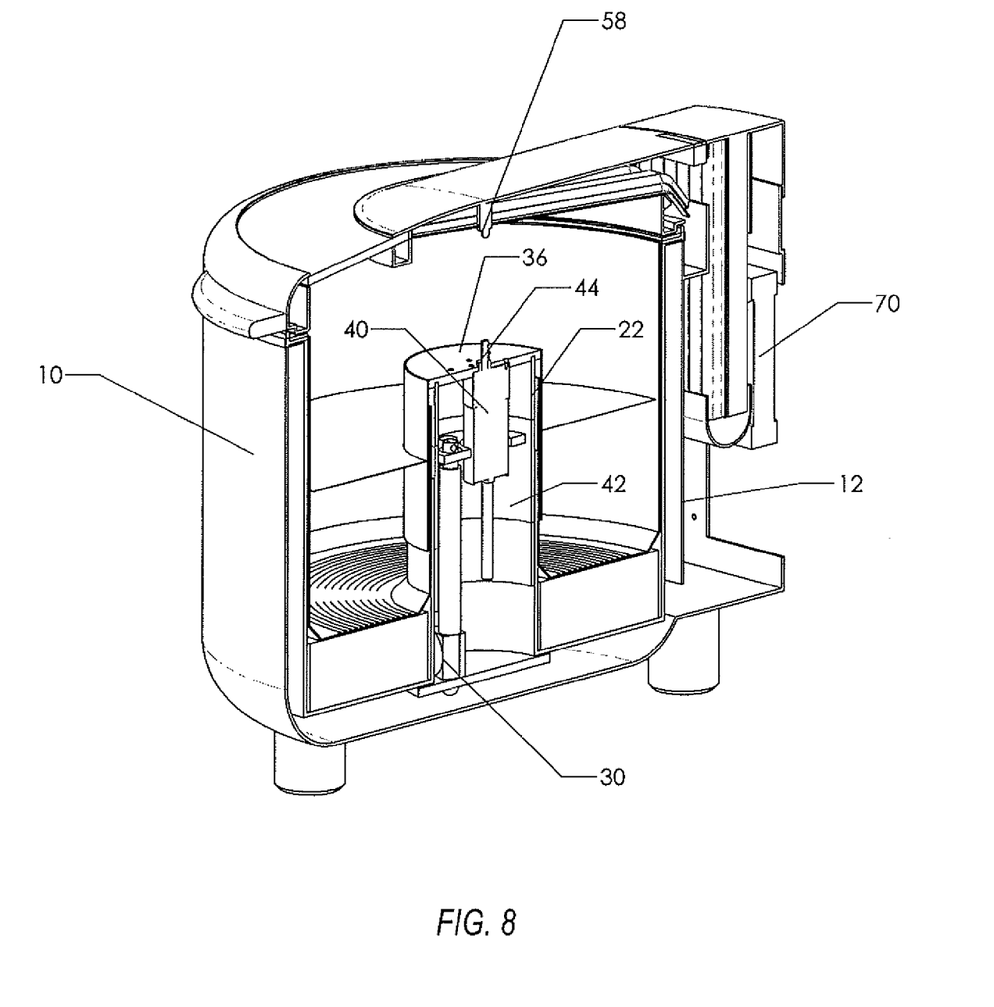
FIG. 8 is a cross-sectional, perspective view illustrating an alternative embodiment of the invention wherein an induction cooking element is built-in, the basket support is in non-extended configuration and the basket and a rotatable upper portion of the basket support removed, the figure additionally disclosing use of a removable cylindrical liner wall within the receptacle interior.

The structural components of the apparatus may be modified or supplemented without departing from the spirit or scope of the invention. For example, FIG. 8 shows use of a liner 94 in the receptacle which has an induction cooking element disposed in the liner bottom.

Figure 15:
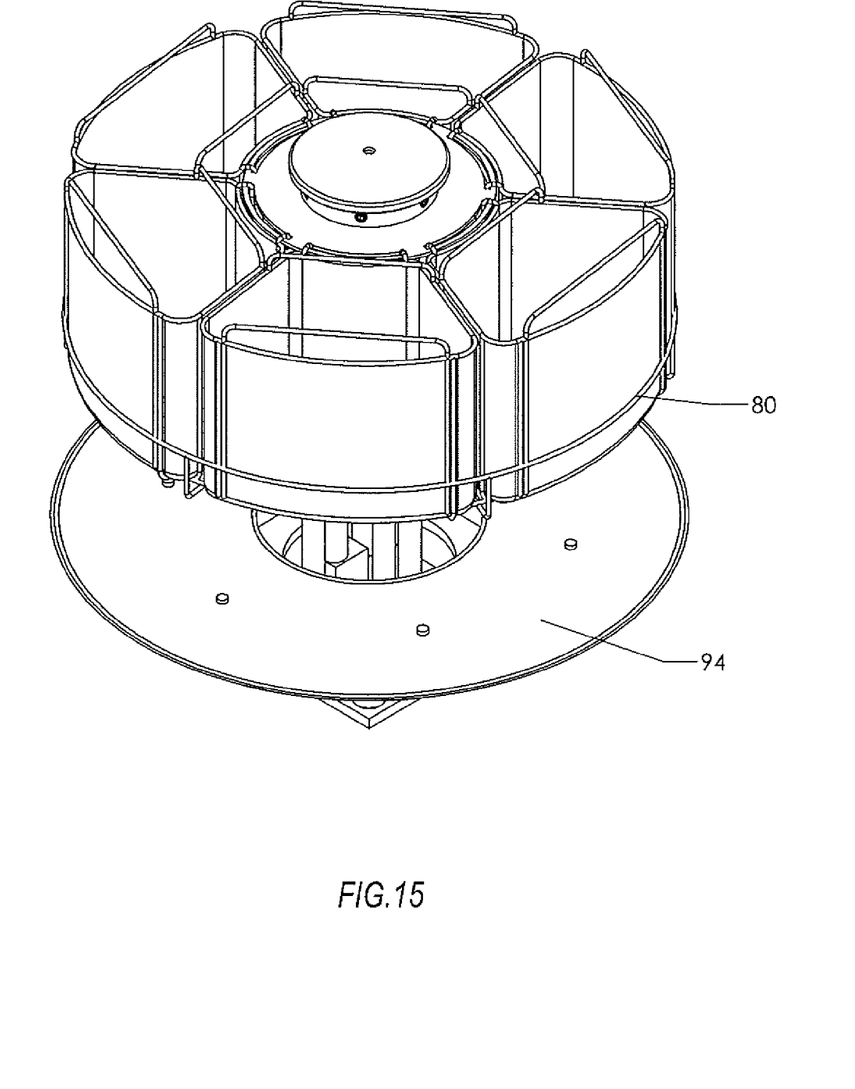
FIG. 15 illustrates use of a screen under the basket to filter out particulates.

FIG. 15 shows an embodiment of the invention in which a lower screen 94 is disposed below basket member 80, the latter attached to rotatable upper segment portion 46 and raised and lowered by the basket support. The basket member 80 when raised prevents a user from touching hot oil in the receptacle. The lower screen 94 is not connected to the basket support, instead resting above the heater element. The lower screen catches particulates in the cooking oil (pieces of food or batter that have fallen out of the basket). When the system is turned off, the basket member 80 removed and the oil is cold, the lower screen can be removed and cleaned of particulates. Being able to do so lengthens the life of the oil.

The invention claimed is:

1. Cooking apparatus comprising, in combination:
   a receptacle having a bottom and side wall defining a receptacle interior for accommodating cooking oil or other cooking liquid;
   heating structure operatively associated with said receptacle for heating the cooking liquid in the receptacle interior;
   an elongated extensible basket support extending upwardly from the receptacle bottom into said interior, said basket support spaced from said side wall and selectively alternatively forming an extended configuration or forming a non-extended configuration;
   first actuator structure operatively associated with said basket support for selectively alternatively moving the basket support between said extended configuration and said non-extended configuration;
   a basket supported by said basket support and including a basket bottom and a basket outer wall defining a basket interior for holding food, movement of said basket support to the extended configuration by said first actuator structure lifting said basket within said receptacle interior and movement of said basket support by said first actuator structure to the non-extended configuration lowering said basket within said receptacle interior, said basket having a toroidal configuration and including a basket inner wall spaced from said basket outer wall and defining a recess accommodating said basket support; and
   second actuator structure operatively associated with said basket support for spinning said basket when said basket support is in the extended configuration, said basket support including a lower segment extending upwardly from said receptacle bottom and an upper segment movable along a vertical axis relative to said lower segment, said first actuator structure including an electric motor operatively associated with said upper segment to alternatively move said upper segment up or down along said vertical axis relative to said lower segment, at least a portion of said upper segment rotatable relative to said lower segment about said vertical axis, said second actuator structure including an electric motor supported by said basket support and operable to rotate the portion of said upper segment about said vertical axis.

2. The cooking apparatus according to claim 1 wherein said first actuator structure comprises a linear actuator.

3. The cooking apparatus according to claim 1 additionally comprising a lid pivotally connected to said receptacle and movable between open and closed positions.

4. The cooking apparatus according to claim 3 wherein said lid includes a downwardly extending projection, and wherein said upper segment defines an opening, and said projection positioned in said opening when said lid is closed and cooperable with said upper segment to stabilize said basket support and limit movement of said basket support caused by spinning of said basket.

5. The cooking apparatus according to claim 3 wherein said lid has a domed underside for directing moisture outwardly and downwardly and a peripherally extending collection trough for collecting the moisture directed outwardly and downwardly by said lid.

6. The cooking apparatus according to claim 5 wherein said lid additionally includes a plurality of overlapping channel members disposed under said domed underside for collecting built-up condensation and moisture, said channel members being slanted to direct accumulated condensate toward said peripherally extending collection trough.

7. The cooking apparatus according to claim 1 wherein said heating structure comprises thermostat controlled electrical heating elements disposed at the bottom of the receptacle.

8. The cooking apparatus according to claim 1 wherein said basket includes a plurality of separate cooking segments for holding different foods or individual servings of foods.

9. The cooking apparatus according to claim 1 additionally comprising filtration structure for controlling moisture and odor emissions related to cooking of foods within said receptacle.

10. The cooking apparatus according to claim 1 additionally comprising an encoded structural element for controlling operation of said apparatus.

11. The cooking apparatus according to claim 10 wherein the encoded structural element comprises either a food pouch, a label or card relating to the food being cooked by the apparatus.

12. Cooking apparatus comprising, in combination:
    a receptacle having a bottom and side wall defining a receptacle interior for accommodating cooking oil or other cooking liquid;
    heating structure operatively associated with said receptacle for heating the cooking liquid in the receptacle interior;
    an elongated extensible basket support extending upwardly from the receptacle bottom into said interior, said basket support spaced from said side wall and selectively alternatively forming an extended configuration or forming a non-extended configuration;
    first actuator structure operatively associated with said basket support for selectively alternatively moving the basket support between said extended configuration and said non-extended configuration;
    a basket supported by said basket support and including a basket bottom and a basket outer wall defining a basket interior for holding food, movement of said basket support to the extended configuration by said first actuator structure lifting said basket within said receptacle interior and movement of said basket support by said first actuator structure to the non-extended configuration lowering said basket within said receptacle interior; and
    second actuator structure operatively associated with said basket support for spinning said basket when said basket support is in the extended configuration, said heating structure comprising a built-in induction cooking element, said cooking apparatus additionally including a removable cooking vessel within the receptacle.

13. Cooking apparatus comprising, in combination:
    a receptacle having a bottom and side wall defining a receptacle interior for accommodating cooking oil or other cooking liquid;
    heating structure operatively associated with said receptacle for heating the cooking liquid in the receptacle interior;
    an elongated extensible basket support extending upwardly from the receptacle bottom into said interior, said basket support spaced from said side wall and selectively alternatively forming an extended configuration or forming a non-extended configuration;

first actuator structure operatively associated with said basket support for selectively alternatively moving the basket support between said extended configuration and said non-extended configuration;

a basket supported by said basket support and including a basket bottom and a basket outer wall defining a basket interior for holding food, movement of said basket support to the extended configuration by said first actuator structure lifting said basket within said receptacle interior and movement of said basket support by said first actuator structure to the non-extended configuration lowering said basket within said receptacle interior;

second actuator structure operatively associated with said basket support for spinning said basket when said basket support is in the extended configuration; and filtration structure for controlling moisture and odor emissions relating to cooking of foods within said receptacle, said filtration structure including a variable speed fan and a filter operatively associated with said variable speed fan.

14. Cooking apparatus comprising, in combination:

a receptacle having a bottom and side wall defining a receptacle interior for accommodating cooking oil or other cooking liquid;

heating structure operatively associated with said receptacle for heating the cooking liquid in the receptacle interior;

an elongated extensible basket support extending upwardly from the receptacle bottom into said interior, said basket support spaced from said side wall and selectively alternatively forming an extended configuration or forming a non-extended configuration;

first actuator structure operatively associated with said basket support for selectively alternatively moving the basket support between said extended configuration and said non-extended configuration;

a basket supported by said basket support and including a basket bottom and a basket outer wall defining a basket interior for holding food, movement of said basket support to the extended configuration by said first actuator structure lifting said basket within said receptacle interior and movement of said basket support by said first actuator structure to the non-extended configuration lowering said basket within said receptacle interior;

second actuator structure operatively associated with said basket support for spinning said basket when said basket support is in the extended configuration; and a screen below said basket for removing particulates from the cooking basket.

15. Cooking apparatus comprising, in combination:

a receptacle having a bottom and side wall defining a receptacle interior for accommodating cooking oil or other cooking liquid;

heating structure operatively associated with said receptacle for heating the cooking liquid in the receptacle interior;

an elongated extensible basket support extending upwardly from the receptacle bottom into said interior, said basket support spaced from said side wall and selectively alternatively forming an extended configuration or forming a non-extended configuration;

first actuator structure operatively associated with said basket support for selectively alternatively moving the basket support between said extended configuration and said non-extended configuration;

a basket supported by said basket support and including a basket bottom and a basket outer wall defining a basket interior for holding food, movement of said basket support to the extended configuration by said first actuator structure lifting said basket within said receptacle interior and movement of said basket support by said first actuator structure to the non-extended configuration lowering said basket within said receptacle interior, said basket including a safety wire shield selectively connectable to said basket support above a lower cooking portion of said receptacle; and second actuator structure operatively associated with said basket support for spinning said basket when said basket support is in the extended configuration.

\* \* \* \* \*